Nov. 23, 1926.　　　　　　　　　　　　　　　　1,607,942
C. H. BROWN
APPARATUS FOR THE ABSTRACTION OF GASOLINE
Filed Dec. 5, 1923
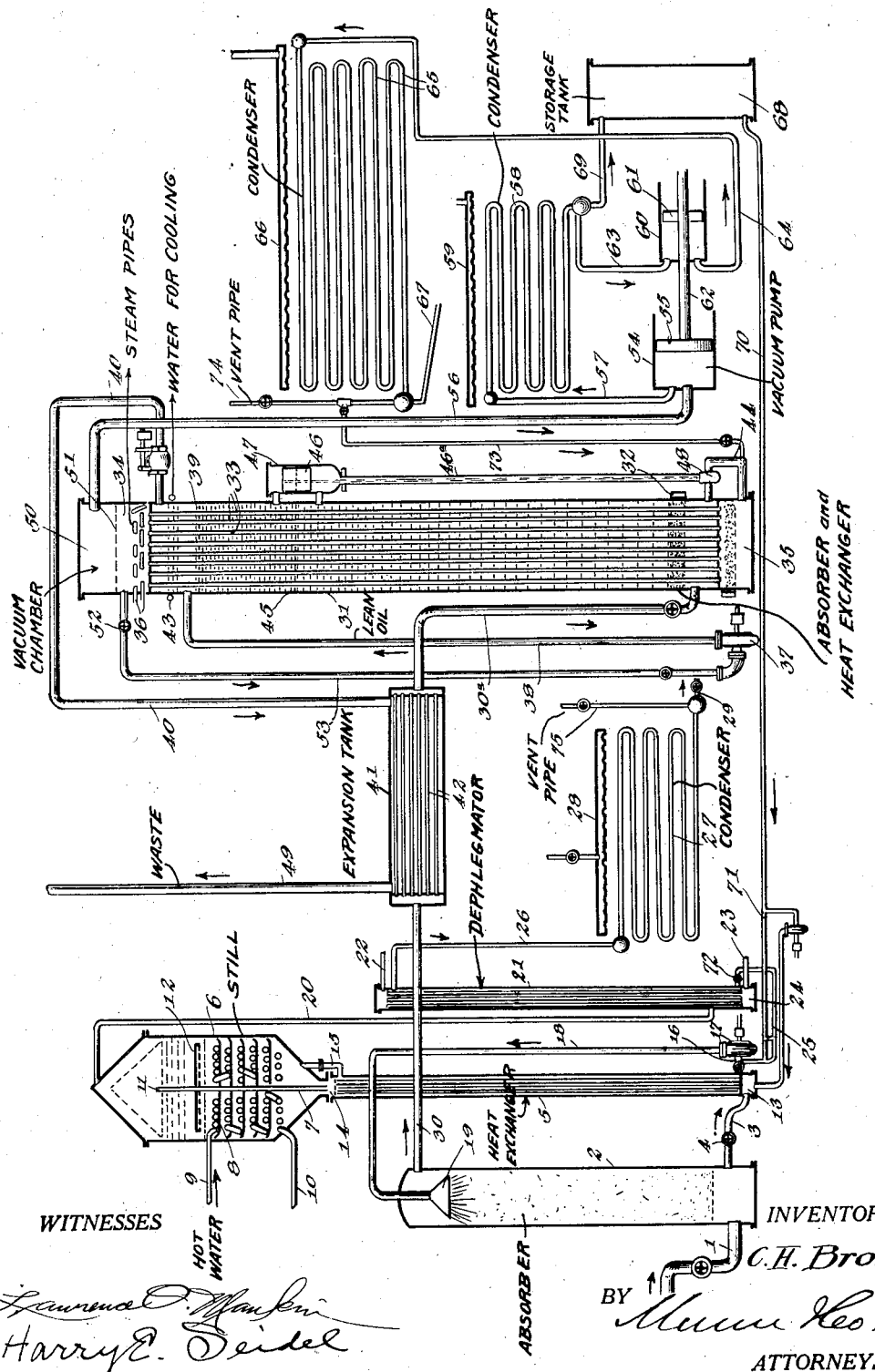
WITNESSES
INVENTOR
C.H. Brown,
BY
ATTORNEYS Patented Nov. 23, 1926.

1,607,942

UNITED STATES PATENT OFFICE.

CHARLES HENRY BROWN, OF BRECKENRIDGE, TEXAS.

APPARATUS FOR THE ABSTRACTION OF GASOLINE.

Application filed December 5, 1923. Serial No. 678,690.

This invention relates to apparatus for recovering the oils from gas wells and other gases (like producer gas) and has for its object the provision of a device in which the latent heat of absorption of the oils in the gas is adapted to furnish the heat for the evaporation of said oils, the transfer being practically instantaneous and accomplished with the least possible amount of apparatus.

Another object of the invention is the provision of a selective system of absorption of the various grades of oil carried by gas from an oil well and in which the low Baumé gravity gasoline vapors are absorbed in preference to the lighter ones by using a small excess of absorber oil above that ordinarily required to absorb the heavy vapors. This leaves the gas in condition for its treatment by a second absorber in which a higher Baumé gravity gasoline is absorbed and is in turn extracted by a vacuum point with an ultimate operation of compression and condensation.

This invention will be best understood from a consideration of the following detailed description, in view of the accompanying drawing, forming a part of the specification; nevertheless it is to be understood that the invention is not confined to the disclosure, being susceptible of such changes and modifications which shall define no material departure from the salient features of the invention as expressed in the appended claims.

The figure diagrammatically represents an apparatus for absorbing the higher Baumé gravity and lower specific gravity gasoline from the gas and for utilizing the heat of absorption to cause an evaporation of the gasoline.

Referring more particularly to the drawings, 1 designates an inlet pipe through which the oil laden gas is charged into a tank 2 partially filled with absorber oil. The absorbed oil from the gas is carried off at the bottom of tank 2 through a pipe 3 provided with a valve 4 to provide back flow of the product. This oil is carried through a heat exchanger 5 to a still 6 through a reduced pipe 7. The still is provided with a plurality of steam coils 8 having an inlet at 9 and an outlet at 10. The absorber oil charged with the low Baumé gravity oils flows out through the top 11 of pipe 7 and falls upon a distributor 12.

The heat exchanger 5 is provided with a plurality of pipes which are in communication with a trap 13 at the bottom of the heat exchanger and through which the oil flows and enters a trap 14 before reaching pipe 7. A pipe 15 connects the bottom of the still 6 with the drum of the heat exchanger 5 which encloses the pipes within the heat exchanger so that the absorber oil is carried downwardly around the pipes and carried off through a pipe 16 at a point above the trap 13 in the heat exchanger 5. A pump 17 forces the absorber oil through a pipe 18 back through a nozzle 19 into the top of the absorber 2.

The low Baumé gravity gasoline vapor is carried out from the top of the still 6 downwardly through a pipe 20 to a dephlegmator or knock-out 21, the pipe connecting with the bottom of the same. The dephlegmator is similar in construction to the heat exchanger 5 and is provided at its top and bottom with water traps connected together by a series of pipes passing through the drum 21 and cool the vapors flowing through the drum. An inlet pipe 22 is connected to the top of the drum 21 while a pipe 23 forms a water outlet from said drum and trap 24. The lean absorber oil is carried from the bottom of the drum and above the water trap 24 through a pipe 25 back to the pump 17 which delivers the absorber oil to the absorber 2. Some of the absorber oil found in the drum 21 is carried over into said drum by the vapors.

A conduit 26 carries the low grade gasoline vapors to condenser coils 27 which are sprayed by water through a nozzle 28. The low grade gasoline is carried off through a pipe 29 to an accumulator tank where it is stored.

It must be remembered that the system thus far is of the regular absorption system except that only the heavier gasoline is recovered and it is to be remembered that this part of the process is necessary even when making gasoline from gas delivered from wells at pressures of 250 lbs. and more, as it has been found that unless the heavy vapors are removed that the absorber oil becomes so saturated with gasoline of higher Baumé gravity it will not evaporate in a vacuum system at ordinary temperatures and it appears that when this saturation point is reached that the lighter vapors are absorbed and saved while the higher Baumé gravity vapors escape. Heretofore no remedy for this trouble has been found in vacuum systems except to heat all the absorber oil each time and run it through heat exchangers and coolers before pumping the lean oil to the condenser. It will be noted that my system does away with this extra cooling apparatus and keeps the absorber oil from becoming saturated with lower specific gravity products.

The higher Baumé gravity gasoline vapors and gas are carried from the top of the absorber 2 through a pipe 30 through the tubes 42 of the expander 41 and thence through a pipe 30ª to the bottom of the higher Baumé gravity gasoline absorber 31. Pipe 30ª is connected to the drum of said absorber below the screens 32 where it is passed upwardly through the higher Baumé gravity gasoline absorber oil and absorbed thereby. The heat of absorption is conveyed to the pipes 33 mounted in the drum of the absorber. The upper ends of the pipes 33 are connected to a trap 34 while the lower ends of said pipes are connected to a trap 35 at the lower end of the drum. Steam heating coils 36 are located in the trap 34 to raise the temperature at certain periods of the year when it is necessary.

The higher Baumé gravity gasoline vapors ascend through the drum 31 against the lean oil being forced into the drum by a pump 37 through a pipe 38, the gasoline vapors coming into contact with tubes 33. The absorber oil is spread over the transverse area of the drum 31 by a special baffle 39 located at the top of the drum of the evaporator and around the tubes 33. The lean gases which have given up their higher Baumé gravity gasoline vapors are discharged into a waste pipe 40 to the drum of the expander 41 which is in the form of a heat exchanger where the gases going to the second absorber 31 are cooled by the expansion of the waste gases from said absorber.

The oil passes from the absorber drum 31 into the trap 35 and into the evaporator tubes 33 through the connection 44 which is connected with the drum 31 and the trap 35 at the lower end of the absorber and the flow is controlled in accordance with the quantity of oil pumped into the drum 31 with the oil level, as shown at 45, being maintained by regulating the float 46 in the float chamber 47. The float chamber 47 is connected by means of a tubular member 46ª with the valve casing carrying the valve 48. A rod connects the float 46 with the said valve and the valve is located in the U-shaped connection 44 for placing the drum 41 in communication with the trap 35. It will be seen that the oil level may be maintained at various heights by regulating the position of the float 46.

The rich oil when passing from the absorber section 41 to the evaporator section which includes the pipe 33, changes in pressure since the absorber works from 5 to 250 lbs. per square inch while the evaporator works at about 22 inches of vacuum. The degree of vacuum necessary is dependent upon the agitation of the rich oil, the exposed surfaces of the oil, the temperature of the oil and the specific gravity of the gasoline being extracted. For instance, in summer, it is advisable when saving the very higher Baumé gravity gasoline to continually spray the outside of the absorber with water through pipe 43 to counteract the high atmospheric temperature and aid the absorber, while in the winter steam is passed through the coils 36 at the top of the evaporator to raise the temperature and aid the oil to complete the evaporation of the gasoline since part of the heat of absorption will have been passed out through the shell to the atmosphere.

A waste pipe 49 connected with the drum 41 carries off the waste gases which have escaped from the drum 31 through the pipe 40. A vacuum chamber 50 is maintained at the top of the drum 31 and the evaporation oil level is shown at 51 below the vacuum chamber.

A trap or valve 52 in the pipe 53 controls the flow of lean oil from the drum 31 to the pump 37, the oil being returned to the absorption portion of the drum 31 through the pipe 38. The vacuum in the chamber 50 is produced through a pump comprising a cylinder 54 and piston 55. The pump creates a negative pressure in the chamber 50 and withdraws the higher Baumé gravity gasoline from the evaporator portion of the drum 31 through a pipe 56, and discharges the same through a pipe 57 connected with the condensing coil 58. A cold water spray 59 is adapted to spray water on the coil 58 for cooling the same.

A compressor comprising a cylinder 60 and a piston 61 which is connected to the same piston rod 62 to which the piston 55 is connected, is adapted to clean out all the gasoline vapors from the absorber oil from the knock-out coils 58 by withdrawing said vapors through a suction pipe 63 and after passing through the pump discharging the vapors through a tube 64 to condenser coils 65 which are sprayed with water from the member 66. The higher Baumé gravity gasoline is then carried through a pipe 67 to an accumulator where it is stored.

An accumulator tank 68 collects the knock-out products from the coils 58 through a pipe 69 which provides a drain for the very lower specific gravity gasoline mixture and absorber oil from said coils. The liquid in tank 68 is carried back through the knock-out line 70 to the pump which again forces the absorber oil to the steam distilling system. A small connection 71 in communication with pipe 70 connects with pipe 25 which leads the mixture from the tank 68 to the pump 17.

A trap 72 in the pipe 25 is for the purpose of sending the knock-out oil to pump 17.

A conduit 73 connects the vent pipe 74 with the U-shaped connections 44 in order to deliver part of the uncondensed vapors of the evaporator to agitate the rich oil and aid in evaporation of the higher Baumé gravity gasoline.

A vent 75 connected with the coils 27 is connected to the vacuum lines.

What I claim is:

1. An apparatus of the class described, comprising in combination, means supplied with a quantity of absorber oil which is in excess of the quantity required to absorb the lower Baumé gravity gasoline for causing absorption of the lower Baumé gravity gasoline, means for supplying the first mentioned means with gasoline-laden gas, a still for separating said gasoline from the absorber oil, a heat exchanger connected with the first mentioned means for receiving the gas carrying only the higher Baumé gravity gasoline for cooling said gas, a second absorber tank connected with the heat exchanger, means for introducing absorber oil into the top of the tank, and means connecting the heat exchanger with the body of the tank whereby the higher Baumé gravity gasoline laden gas is charged into the bottom of said tank whereby the gas flows upward through the down stream of the absorber oil, a plurality of tubes located in the tank, chambers at the top and bottom of the tank and connected by the tubes but out of communication with the body of the tank, means connecting the space in the tank around the tubes with the lower chamber whereby the absorber oil charged with higher Baumé gravity gasoline is permitted to enter the tubes whereby the heat caused by the absorber oil absorbing the higher Baumé gravity gasoline is imparted to the tubes and to the absorber oil charged with higher Baumé gravity gasoline passing through said tubes, and means for maintaining a lower pressure in said tubes and chambers than in the tank space around said tubes.

2. An apparatus of the class described, comprising in combination, means supplied with a quantity of absorber oil which is in excess of the quantity required to absorb the lower Baumé gravity gasoline for causing absorption of the lower Baumé gravity gasoline, means for supplying the first mentioned means with gasoline-laden gas, a still for separating said gasoline from the absorber oil, a heat exchanger connected with the first mentioned means for receiving the gas carrying only the higher Baumé gravity gasoline for cooling said gas, a second absorber tank connected with the heat exchanger, means for introducing absorber oil into the top of the tank, and means connecting the heat exchanger with the body of the tank whereby the higher Baumé gravity gasoline laden gas is charged into the bottom of said tank whereby the gas flows upward through the down stream of the absorber oil, a plurality of tubes located in the tank, chambers at the top and bottom of the tank and connected by the tubes but out of communication with the body of the tank, means connecting the space in the tank around the tubes with the lower chamber whereby the absorber oil charged with higher Baumé gravity gasoline is permitted to enter the tubes whereby the heat caused by the absorber oil absorbing the higher Baumé gravity gasoline is imparted to the tubes and to the absorber oil charged with higher Baumé gravity gasoline passing through said tubes, and a pump connected with the upper chamber of the tank for creating a vacuum in said upper chamber whereby the higher Baumé gravity gasoline is withdrawn from the tank.

3. An apparatus of the class described, comprising in combination, means supplied with a quantity of absorber oil which is in excess of the quantity required to absorb the lower Baumé gravity gasoline for causing absortion of the lower Baumé gravity gasoline, means for supplying the first mentioned means with gasoline-laden gas, a still for separating the low gravity gasoline from the absorber oil, a heat exchanger connected with the first mentioned means for receiving the gas carrying only the higher Baumé gravity gasoline for cooling said gas, a second absorber tank connected with the heat exchanger, means for introducing absorber oil into the top of the tank, and means connecting the heat exchanger with the body of the tank whereby the higher Baumé gravity gasoline laden gas is charged into the bottom of said tank whereby the gas flows upward through the down stream of the absorber oil, a plurality of tubes located in the tank, chambers at the top and bottom of the tank and connected by the tubes but out of communication with the body of the tank, means connecting the space in the tank around the tubes with the lower chamber whereby the absorber oil charged with higher Baumé gravity gasoline is permitted to enter the tubes whereby the heat caused by the absorber oil absorbing the higher Baumé gravity gasoline is imparted to the tubes and to the absorber oil charged with higher Baumé gravity gasoline passing through said tubes, a pump connected with the upper chamber of the tank for creating a vacuum in said upper chamber whereby the higher Baumé gravity gasoline is withdrawn from the tank, a cooler connected with the pump to receive the higher Baumé gravity gasoline and a second pump connected with said cooler for withdrawing the higher Baumé gravity gasoline from the cooler.

4. An apparatus of the class described, comprising in combination, means supplied with a quantity of absorber oil which is in excess of the quantity required to absorb the lower Baumé gravity gasoline for causing absortion of the lower Baumé gravity gasoline, means for supplying the first mentioned means with gasoline-laden gas, a still for separating the low gravity gasoline from the absorber oil, a heat exchanger connected with the first mentioned means for receiving the gas carrying only the higher Baumé gravity gasoline for cooling said gas, a second absorber tank connected with the heat exchanger, means for introducing absorber oil into the top of the tank, and means connecting the heat exchanger with the body of the tank whereby the higher Baumé gravity gasoline laden gas is charged into the bottom of said tank whereby the gas flows upward through the down stream of the absorber oil, a plurality of tubes located in the tank, chambers at the top and bottom of the tank and connected by the tubes but out of communication with the body of the tank, means connecting the space in the tank around the tubes with the lower chamber whereby the absorber oil charged with higher Baumé gravity gasoline is permitted to enter the tubes whereby the heat caused by the absorber oil absorbing the higher Baumé gravity gasoline is imparted to the tubes and to the absorber oil charged with higher Baumé gravity gasoline passing through said tubes, a pump connected with the upper chamber whereby the higher Baumé gravity gasoline is withdrawn from the tank, a cooler connected with the pump to receive the higher Baumé gravity gasoline, a second pump connected with said cooler for withdrawing the higher Baumé gravity gasoline from the cooler, and a tank connected with the cooler for receiving the absorber oil and higher Baumé gravity gasoline mixture.

5. An apparatus of the class described, comprising in combination, means supplied with a quantity of absorber oil which is in excess of the quantity required to absorb the lower Baumé gravity gasoline for causing absorption of the lower Baumé gravity gasoline, means for suppling the first mentioned means with gasoline-laden gas, a still for separating the low gravity gasoline from the absorber oil, a heat exchanger connected with the first mentioned means for receiving the gas carrying only the higher Baumé gravity gasoline for cooling said gas, a second absorber tank connected with the heat exchanger, means for introducing absorber oil into the top of the tank, and means connecting the heat exchanger with the body of the tank whereby the higher Baumé gravity gasoline laden gas is charged into the bottom of said tank whereby the gas flows upward through the down stream of the absorber oil, a plurality of tubes located in the tank, chambers at the top and bottom of the tank and connected by the tubes but out of communication with the body of the tank, means connecting the space in the tank around the tubes with the lower chamber whereby the absorber oil charged with higher Baumé gravity gasoline is permitted to enter the tubes whereby the heat caused by the absorber oil absorbing the higher Baumé gravity gasoline is imparted to the tubes and to the absorber oil charged with higher Baumé gravity gasoline passing through said tubes, a pump connected with the upper chamber of the tank for creating a vacuum in said upper chamber whereby the higher Baumé gravity gasoline is withdrawn from the tank, and means connecting the top of the tank with the heat exchanger whereby the exhausted gas is charged into heat exchanger for absorbing the heat of the higher Baumé gravity gasoline laden gas passing through the heat exchanger.

CHARLES HENRY BROWN.